Patented May 11, 1943

2,318,746

UNITED STATES PATENT OFFICE 2,318,746

PROCESS OF COMPOUNDING RUBBER

Theodore A. Bulifant, Hackensack, N. J., assignor, by mesne assignments, to Allied Chemical & Dye Corporation, a corporation of New York No Drawing. Application November 13, 1939,
Serial No. 304,167

5 Claims. (Cl. 260—758)

This invention relates to the manufacture of vulcanized rubber and more particularly to a process of compounding and vulcanizing rubber.

In the manufacture of vulcanized rubber products, it is customary to mix thoroughly rubber, sulfur, vlcanizing accelerator and other ingredients such as rubber softeners, fillers such as carbon black, zinc oxide, clays, etc. on the rolls of a rubber mill and then to subject the resultant rubber mix to elevated temperatures to effect vulcanization of the rubber.

It is an object of the invention to provide a process of compounding rubber which process results in the production of readily reproducible vulcanized rubber products.

It is another object of the invention to provide a process of activating the cure of rubber mixes containing customary amounts of sulfur and vulcanizing accelerator which reduces the time required for vulcanizing the rubber stock to a high state of cure, and results in an improved rubber product. Other objects and advantages will appear hereinafter.

As a result of extensive development work in this field I have discovered that incorporation of .1 to .6% by weight, based on the weight of the rubber, of an aromatic base containing nitrogen in the ring, having a boiling point of above about 210° C. in a rubber mix containing sulfur as the vulcanizing agent and vulcanizing accelerators such as acid type accelerators, e. g. mercaptobenzothiazole, and basic type accelerators, e. g. the aldehyde-amine type accelerators and also the guanidine derivatives, e. g. diphenlyguanidine and diorthotolylguanidine, results in improved rubber products upon vulcanization of the rubber mix. The aromatic base containing nitrogen in the ring may be incorporated in the rubber mix as a constituent of the softener added to the mix, or may be added separately to the rubber mix. Preferably aromatic bases containing the pyridine nucleus are employed in conjunction with accelerators of the acid type such as mercaptobenzothiazole. Such organic base material may advantageously be commercial mixtures of coal tar bases boiling above about 210° C. including constituents such as quinoline, isoquinoline, quinaldine, dimethyl and trimethyl substitutes, and other tar bases. Individual constituents of such mixtures and synthetic bases involving a nitrogen-containing ring may also be employed.

The incorporation of from .1 to .6% by weight of such organic base material based on the weight of the rubber in rubber mixes containing normal amounts of accelerators activates the cure of the rubber so that the time required for effecting vulcanization to a high state of cure is reduced and the cured stock possesses improved tensile properties, e. g. greater tensile strength and greater stress is required to produce a given elongation. Furthermore, when organic base material involving a nitrogen-containing ring is incorporated in the rubber stock, the amounts of the relatively expensive vulcanization accelerators may be reduced in many cases with consequent reduction in cost without detrimentally affecting the properties of the cured stock.

The organic base material employed for activating the cure of the rubber may advantageously be blended with a rubber softener in proportions of from 2 to 10%, preferably 3 to 7%, by weight based on the weight of the softener and the resultant blend mixed with the rubber in proportions such that the rubber mix contains from .1 to .6% of the organic base materials based on the weight of the rubber. In general the organic base material may be blended with any suitable rubber softener, e. g. fractions of creosote oil and other coal tar distillates boiling above about 200° C., fractions of water gas tar distillate boiling above about 200° C., fractions of petroleum distillate boiling above about 200° C., pine tar, pine oils, rosin oils, palm oils, other vegetable fats or oils, asphalts, resins such as paracoumarone resin, and other rubber softening materials. The coal tar bases are soluble in such softeners and hence blends of the softeners and bases may readily be distributed uniformly throughout the rubber mix during the usual milling operation. A particularly desirable blend is constituted of from about 3 to 10% by weight of coal tar bases boiling above 210° C. and coal tar distillate limpid oil boiling above about 200° C. having a specific gravity above about 1.06 at 38° C. and characterized by substantial freedom from crystalline material at 25° C. Such blend may be produced by distilling a creosote oil fraction which has not been extracted to remove tar bases, as is customarily the practice, to obtain a coal tar oil having a specific gravity of about 1.06 at 38° C., a boiling point above 200° C., and a content of tar bases within the limits of 3 to 10%; or it may be made, as above indicated, by blending with a coal tar oil having the desired boiling point and specific gravity, an amount of tar bases sufficient to increase the tar base content to within the range of 3 to 10% and preferably within the range of 3 to 7%. The species of this invention involving the incorporation in a rubber mix of a softener constituted of a coal tar oil having a tar base content within the limits of from 3 to 10%, a specific gravity of above 1.06 at 38° C., a boiling point above about 200° C., characterized by substantial freedom from crystalline material at 25° C. is disclosed and claimed in my co-pending application Serial No. 304,166 filed on the same day as this application.

As illustrative of the invention, the following examples of compositions suitable for the manufacture of inner tube stock are given, parts being by weight:

EXAMPLES I TO VIII

Parts by weight

|  | I | II | III | IV | V | VI | VII | VIII |
|---|---|---|---|---|---|---|---|---|
| Smoked sheets (rubber) | 100 | 100 | 100 | 100 | 100 | 100 | 100 | 100 |
| Softener: | | | | | | | | |
| Pine tar blended with 6% of tar bases | 5 | | | | | | | |
| Pine tar blended with 3% of tar bases | | 5 | | | | | | |
| Coal tar distillate blended with 3% of tar bases | | | 5 | | | | | |
| Water gas tar distillate blended with 3% of tar bases | | | | 5 | | | | |
| Semi-liquid asphalt blended with 3% of tar bases | | | | | 5 | | | |
| Palm oil blended with 3% of tar bases | | | | | | 5 | | |
| Paracoumarone resin blended with 3% of tar bases | | | | | | | 5 | |
| Petroleum distillate blended with 3% of tar bases | | | | | | | | 5 |
| Whiting | 50 | 50 | 50 | 50 | 50 | 50 | 50 | 50 |
| Zinc oxide | 5 | 5 | 5 | 5 | 5 | 5 | 5 | 5 |
| Stearic acid | 1 | 1 | 1 | 1 | 1 | 1 | 1 | 1 |
| Sulfur | 3 | 3 | 3 | 3 | 3 | 3 | 3 | 3 |
| Mercaptobenzothiazole (Captax) | .6 | .6 | .6 | .6 | .6 | .6 | .6 | .6 |

The 5 parts of softener containing 6% of tar bases (Example I) correspond to .3% by weight of the tar bases, based on the weight of the rubber; the 5 parts of softener containing 3% tar bases present in the other examples correspond to .15% by weight of tar bases, based on the weight of the rubber.

The car bases blended with the softeners in the above examples was a fraction of bases derived from coal tar, which fraction was constituted chiefly of homologues of quinoline and isoquinoline, mainly dimethyl and trimethyl substitutes; the fraction had an initial boiling point of about 228° C., and a decomposition point of about 362° C.

The coal tar distillate and water gas tar distillate of Examples III and IV were limpid oils having specific gravities at 15.5° C. of 1.08 and 1.121 respectively, were free from crystalline material at 25° C. and had the following distillation characteristics:

|  | Coal tar distillate | Water gas tar distillate |
|---|---|---|
| Per cent distilled off at 210° C | 0 | 3.6 |
| Per cent distilled off at 235° C | 1.1 | 7.9 |
| Per cent distilled off at 300° C | 56.7 | 21.6 |
| Per cent distilled off at 355° C | 81 | 42.1 |

The paracoumarone resin of Example VII had a melting point of about 25° C. and the petroleum distillate of Example VIII had a distillation range of from about 315° to 415° C. and a specific gravity of .92 at 25° C.

The ingredients of the rubber mixes were assembled and milled in the customary manner and batches of each of the milled products were cured for 10, 20, 30, 40 and 50 minutes at a temperature of 281° F. corresponding to a steam pressure of 35 pounds per square inch. As hereinafter discussed, the cured stocks were subjected to tensile, aging and hardness tests.

EXAMPLES IX TO XII

Parts by weight

|  | IX | X | XI | XII |
|---|---|---|---|---|
| Smoked sheets (rubber) | 100 | 100 | 100 | 100 |
| Softener: | | | | |
| Pine tar blended with 3% of tar bases | 5 | | 5 | |
| Pine tar blended with 6% of tar bases | | 5 | | 5 |
| Whiting | 50 | 50 | 50 | 50 |
| Zinc oxide | 5 | 5 | 5 | 5 |
| Stearic acid | 1 | 1 | 1 | 1 |
| Sulfur | 3 | 3 | 3 | 3 |
| Accelerator: | | | | |
| Butyraldehyde-aniline condensation product (No. 808) | .4 | .4 | | |
| Diphenylguanidine (D. P. G.) | | | 1 | 1 |

The 5 parts of softener in Examples IX and XI containing 3% of tar bases correspond to .15% of tar bases based on the weight of the rubber; the 5 parts of softener containing 6% of tar bases, Examples X and XII, correspond to .3% of tar bases, based on the weight of the rubber.

The tar bases blended with the pine tar were similar to the bases employed in Examples I to VIII. The ingredients of Examples IX to XII were assembled and milled in the customary manner and batches of the milled products were cured at 10, 20, 30, 40, 50, 60, 70 and 80 minutes at a temperature of 287° F. corresponding to a steam pressure of 40 pounds per square inch. As hereinafter discussed, the cured stocks were subjected to tensile, aging and hardness tests.

The following examples are illustrative of the incorporation of individual organic bases involving a nitrogen-containing ring in rubber mixes suitable for the manufacture of tire tread stock:

EXAMPLES XIII TO XV

Parts by weight

|  | XIII | XIV | XV |
|---|---|---|---|
| Smoked sheets (rubber) | 100 | 100 | 100 |
| Softener: | | | |
| Petroleum distillate blended with 5% of isoquinoline | 5 | | |
| Petroleum distillate blended with 5% of quinoline | | 5 | |
| Petroleum distillate blended with 5% of quinaldine | | | 5 |
| Carbon black | 50 | 50 | 50 |
| Zinc oxide | 5 | 5 | 5 |
| Stearic acid | 4 | 4 | 4 |
| Neozone-D (phenyl-beta-naphthylamine) | 15 | 15 | 15 |
| Sulfur | 3 | 3 | 3 |
| Mercaptobenzothiazole (Captax) | 1 | 1 | 1 |

The rubber mixes of Examples XIII, XIV, and XV contained 0.25% by weight of isoquinoline, quinoline, and quinaldine, respectively, based on the weight of the rubber.

The petroleum distillate employed in Examples XIII to XV was similar to that employed in Example VIII. The ingredients were assembled, milled in the customary manner and batches of the milled products were cured for 20, 30, 45, 60, 75 and 90 minutes at a temperature of 274° F. corresponding to a steam pressure of 30 pounds per square inch. As hereinafter discussed, the cured stocks were subjected to tensile, aging and hardness tests.

The following examples are illustrative of the incorporation of tar bases directly in rubber mixes, i. e. unblended with rubber softener:

EXAMPLES XVI TO XIX

Parts by weight

|  | XVI | XVII | XVIII | XIX |
|---|---|---|---|---|
| Smoked sheets (rubber) | 100 | 100 | 100 | 100 |
| Whiting | 50 | 50 | 50 | 50 |
| Zinc oxide | 5 | 5 | 5 | 5 |
| Stearic acid | 1 | 1 | 1 | 1 |
| Sulfur | 3 | 3 | 3 | 3 |
| Fraction of coal tar bases boiling above 228° C | .2 | .4 | .3 | .5 |
| Mercaptobenzothiazole (Captax) | .5 | .4 | | |
| Accelerator: Butyraldehyde-aniline condensation product (No. 808) | | | .3 | |
| Diphenylguanidine (D. P. G.) | | | | 1.25 |

The ingredients of the above rubber mixes were assembled and milled in the customary manner and batches of the milled products containing mercaptobenzothiazole accelerator were cured for 10, 20, 30, 40, 50 and 60 minutes at a temperature of about 281° F. corresponding to a steam pressure of 35 pounds per square inch. Batches of the milled products containing butyraldehyde-aniline condensation product (No. 808) and diphenylguanidine (D. P. G.) accelerator were cured for similar periods at a temperature of 287° F. corresponding to a steam pressure of 40 pounds per square inch.

The cured stocks of the above examples were subjected to tensile, aging and hardness tests. The results of these tests showed the stocks to possess satisfactory properties. For purposes of comparison there are given below the results of the tensile and hardness tests on (A) the cured unaged stocks of Example I and (B) cured unaged stocks prepared similarly to those of Example I except that no tar bases were incorporated in the rubber mix.

(A). *Stocks of Example I*

| Cured | Tensile stress (lbs. per sq. in.) at elongation of— | | Tensile strength (lbs. per sq. in.) | Per cent elongation at breaking point | Hardness (Shore) |
|---|---|---|---|---|---|
| | 300% | 500% | | | |
| 10 minutes | 150 | 400 | 1,200 | 700 | 44 |
| 20 minutes | 240 | 700 | 2,570 | 730 | 52 |
| 30 minutes | 270 | 700 | 2,800 | 730 | 54 |
| 40 minutes | 280 | 700 | 2,720 | 720 | 56 |
| 50 minutes | 280 | 700 | 2,620 | 710 | 57 |

(B). *Stocks prepared similarly to those of Example I, except that no tar bases were incorporated*

| Cured | Tensile stress (lbs. per sq. in.) at elongation of— | | Tensile strength (lbs. per sq. in.) | Per cent elongation at breaking point | Hardness (Shore) |
|---|---|---|---|---|---|
| | 300% | 500% | | | |
| 10 minutes | [1] | [1] | [1] | [1] | [1] |
| 20 minutes | 190 | 540 | 2,100 | 740 | 46 |
| 30 minutes | 230 | 610 | 2,530 | 740 | 50 |
| 40 minutes | 250 | 630 | 2,640 | 720 | 51 |
| 50 minutes | 270 | 650 | 2,530 | 730 | 53 |

[1] Undercured.

The results of the tensile, hardness and T-50 tests on (A) the cured unaged stocks of Example XIII and (B) cured unaged stocks prepared similarly to those of Example XIII except that no isoquinoline was incorporated are given below. The T-50 test, which involved elongating samples of rubber stock about 600%, freezing the elongated samples at a temperature of about −60° C., then gradually warming the samples up and measuring the temperature at which they had lost 50% of their initial elongation, is recognized in the rubber industry as indicating the state of cure, i. e. the degree of vulcanization of rubber. The lower the temperature at which the sample loses 50% of its initial elongation the higher the state of cure of the rubber.

(A). *Stocks of Example XIII*

| Cured | Tensile stress (lbs. per sq. in.) at elongation | | Tensile strength (lbs. per sq. in.) | Percent elongation at breaking point | Hardness (Shore) | T-50 values (° C.) |
|---|---|---|---|---|---|---|
| | 300% | 500% | | | | |
| 20 minutes | 1160 | 2800 | 3380 | 580 | 55 | +9.5 |
| 30 minutes | 1600 | 3450 | 3800 | 540 | 61 | −0.2 |
| 45 minutes | 1930 | 3960 | 3960 | 500 | 63 | −10 |
| 60 minutes | 2050 | | 3720 | 460 | 65 | −15 |
| 75 minutes | 2200 | | 3640 | 440 | 65 | −19.1 |
| 90 minutes | 2280 | | 3640 | 430 | 66 | −22 |

(B). *Stocks prepared similarly to those of Example XI, except that no isoquinoline was incorporated*

| Cured | Tensile stress (lbs. per sq. in.) at elongation | | Tensile strength (lbs. per sq. in.) | Percent elongation at breaking point | Hardness (Shore) | T-50 values (° C.) |
|---|---|---|---|---|---|---|
| | 300% | 500% | | | | |
| 20 minutes | 720 | 1780 | 2170 | 570 | 46 | +14.8 |
| 30 minutes | 1160 | 2620 | 3100 | 560 | 56 | +7 |
| 45 minutes | 1470 | 3200 | 3580 | 550 | 61 | −0.2 |
| 60 minutes | 1780 | 3600 | 3810 | 520 | 62 | −5.8 |
| 75 minutes | 1860 | 3730 | 3730 | 500 | 63 | −9.5 |
| 90 minutes | 1970 | | 3580 | 480 | 64 | −13.5 |

It will be noted that incorporation of organic base material involving a nitrogen-containing ring in the rubber mixes resulted in vulcanized stocks of greater tensile strength and hardness and the stocks require greater stress to produce a given elongation than the vulcanized stocks in which no organic base was incorporated. Furthermore, such bases promote reduction of the vulcanizing time necessary for obtaining satisfactory cure of the rubber. Thus the rubber mixes of Examples I and XIII attained optimum tensile strength after vulcanization for 30 and 45 minutes respectively while vulcanization of the corresponding mixes containing no organic base for 40 and 60 minutes respectively was necessary to impart optimum tensile strength to the rubber. The rubber industry recognizes that the tensile strength of vulcanized rubber indicates the state of cure. The above results of the hardness and T-50 tests also show the incorporation of organic base material involving a nitrogen-containing ring in rubber mixes reduces the time required for vulcanizing the rubber stock to a high state of cure.

Tests on the vulcanized products of Examples XVI to XIX showed that incorporation of organic base material in rubber mixes may be accompanied by reduction of the amount of the relatively expensive rubber accelerators employed with consequent reduction in the cost without detrimentally affecting the properties of the rubber stocks.

This invention, it will be noted, renders it possible to produce rubber compositions which result in rubber articles possessing better wearing qualities than articles heretofore produced and is particularly applicable to the manufacture of dark colored rubber products such as tire treads, tire tubes, rubber heels, rubber soles, and various mechanical rubber goods where the improved qualities imparted by this invention are desirable.

The tensile and hardness values given herein were determined in accordance with tests prescribed by the American Society for Testing Materials.

I claim:

1. A process of vulcanizing rubber which comprises mixing with the rubber sulfur vulcanizing agent, an activatable vulcanizing accelerator and a blend of rubber softener with from 2 to 10 per cent by weight of aromatic base material containing the pyridine nucleus capable of activating said accelerator, said base material boiling above about 210° C., said softener being employed in amount such that the rubber contains from .1 to .6 per cent of said aromatic base material based on the weight of the rubber hydrocarbon, and vulcanizing the rubber.

2. A process of vulcanizing rubber which comprises mixing with the rubber sulfur vulcanizing agent, an activatable vulcanizing accelerator and a rubber softener containing from 3 to 7 per cent by weight of a fraction of organic bases containing the pyridine nucleus derived from coal tar, said fraction being capable of activating said accelerator and constituted chiefly of homologs of quinoline and isoquinoline and boiling above 210° C., said softener being employed in amount such that the rubber contains from .1 to .6 per cent of said organic bases based on the weight of the rubber hydrocarbon, and vulcanizing the rubber.

3. A process as specified in claim 2 in which the rubber softener is pine tar.

4. A process as specified in claim 2 in which the rubber softener is petroleum distillate having a boiling point of above about 300° C.

5. A process as specified in claim 2 in which the rubber softener is asphalt.

THEODORE A. BULIFANT.